United States Patent [19]

Heckles

[11] 4,218,515
[45] Aug. 19, 1980

[54] ACRYLATE-CYANOACETATE-UREADIACETOACETAMIDE-DIACETOACETAMIDE COPOLYMERS USEFUL AS PROTECTIVE SURFACES

[76] Inventor: John S. Heckles, 1408 Springside Dr., Lancaster, Pa. 17603

[21] Appl. No.: 38,548

[22] Filed: May 14, 1979

[51] Int. Cl.$^2$ .................. B32B 27/08; B32B 27/30; B32B 27/34
[52] U.S. Cl. ............................. 428/474; 428/476; 528/362; 528/363
[58] Field of Search ................. 528/363, 362; 428/474.4, 476.3

[56] References Cited
U.S. PATENT DOCUMENTS 3,924,023  12/1975  Boranian et al. .................. 428/515
4,056,453  11/1977  Barzynski et al. .............. 204/159.23
4,064,199  12/1977  Nishikawa ...................... 204/159.23

Primary Examiner—James C. Cannon
Attorney, Agent, or Firm—Dennis M. Kozak

[57] ABSTRACT

Cross-linked random acrylate-cyanoacetate-ureadiacetoacetamide-diacetoacetamide copolymers are disclosed. These copolymers are prepared by the reaction of at least one polyfunctional acrylate with at least one cyanoacetate, at least one ureadiacetoacetamide and at least one diacetoacetamide in the presence of a catalyst capable of promoting the reaction between the polyfunctional acrylate, the cyanoacetate, the ureadiacetoacetamide, and the diacetoacetamide. In a preferred embodiment, the copolymers are employed to produce wear layer compositions for surface coverings.

20 Claims, No Drawings

ACRYLATE-CYANOACETATE-UREADIACETOACETAMIDE-DIACETOACETAMIDE COPOLYMERS USEFUL AS PROTECTIVE SURFACES

This invention relates to polymers.

More specifically, this invention relates to acrylate-cyanoacetate-ureadiacetoacetamide-diacetoacetamide copolymers and to coatings or films produced from these copolymers.

In one of its more specific aspects, this invention pertains to cross-linked random copolymers which are the reaction products of polyfunctional acrylates, cyanoacetates, ureadiacetoacetamides, and diacetoacetamides.

The resilient flooring industry is continually searching for new abrasion-resistant polymeric compositions which will serve as wear layers for decorative surface coverings, especially thermoplastic floor coverings.

The present invention provides novel acrylate-cyanoacetate-ureadiacetoacetamide-diacetoacetamide polymers which exhibit excellent film-forming properties and abrasion-resistant properties. Accordingly, these polymers, in film form, are well suited for use as wear layers for decorative thermoplastic floor coverings.

According to this invention, there is provided a crosslinked random acrylate-cyanoacetate-ureadiacetoacetamide-diacetoacetamide copolymer produced by the reaction of at least one polyfunctional acrylate with at least one cyanoacetate, at least one ureadiacetoacetamide and at least one diacetoacetamide in the presence of a catalyst capable of promoting the reaction between the polyfunctional acrylate, the cyanoacetate, the ureadiacetoacetamide, and the diacetoacetamide.

Also, according to this invention, there is provided a thermoplastic floor covering coated with a wear layer composition comprising a cross-linked random acrylate-cyanoacetate-ureadiacetoacetamide-diacetoacetamide copolymer produced by the reaction of at least one polyfunctional acrylate with at least one cyanoacetate, ureadiacetoacetamide and at least one diacetoacetamide in the presence of a catalyst capable of promoting the reaction between the polyfunctional acrylate, the cyanoacetate, the ureadiacetoacetamide, and the diacetoacetamide.

It is to be understood that this invention also provides for the production of cross-linked acrylate-cyanoacetate-ureadiacetoacetamide copolymers, and cross-linked acrylate-cyanoacetate-diacetoacetamide copolymers, that is, copolymers prepared by the reaction of at least one polyfunctional acrylate with at least one cyanoacetate, and either at least one ureadiacetoacetamide or at least one diacetoacetamide in the presence of a catalyst capable of promoting the reaction between the polyfunctional acrylate, the cyanoacetate, and either the ureadiacetoacetamide or diacetoacetamide. These acrylate-cyanoacetate-ureadiacetoacetamide copolymers and acrylate-cyanoacetate-diacetoacetamide copolymers have been found to exhibit film-forming properties which make the copolymers suitable for use to produce films or coatings. However, the resulting films or coatings tend to be rather hard, inflexible, and accordingly, not as well suited for use as wear layer compositions for thermoplastic floor coverings as are the acrylate-cyanoacetate-ureadiacetoacetamide-diacetoacetamide copolymers which facilitate the formation of more flexible wear layer coatings.

As the polyfunctional acrylate, use can be made of compounds having the formula

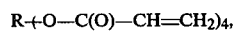

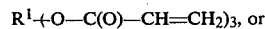

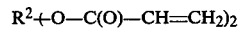

wherein R represents

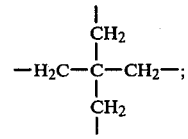

$R^1$ represents

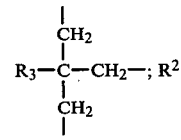

represents: a ($C_1$ to $C_{10}$) alkylene group, a ($C_1$ to $C_4$) alkyl substituted ($C_1$ to $C_{10}$) alkylene group, $+C_2H_4O+_a+C_2H_4+$,

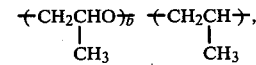

$+CH_2CH_2CH_2CH_2O+_c CH_2CH_2CH_2CH_2—$, a cycloalkylene group, a cycloalkane bearing two ($C_1$ to $C_3$) alkylene groups,

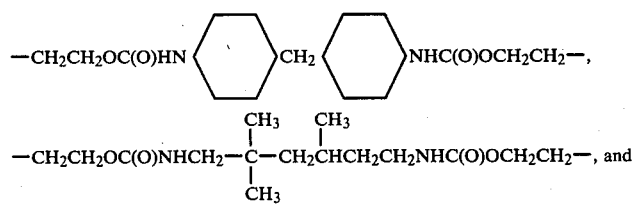

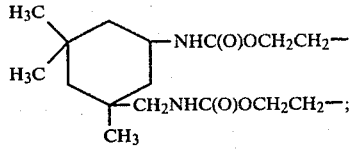

$R^3$ represents hydrogen or ($C_1$ to $C_3$) alkyl; a is an integer from 1 to 20; b is an integer from 1 to 10; and c is an integer from 1 to 5.

Representative of the above useable polyfunctional acrylates are trimethylolpropane triacrylate, pentaerythritol tetraacrylate, hexanediol diacrylate, polyethylene glycol (200) diacrylate, ethylene glycoldiacrylate, tripropyleneglycol diacrylate, trimethyl hexane diol diacrylate, 1,4-cyclohexane dimethanol diacrylate, dibutylene glycol diacrylate, 1,4-cyclohexane diacrylate, dipropyleneglycol di-2-acrylylethyl ether, methylenebis(4-cyclohexane-2-acrylyl-ethyl urethane), 2,2,4-trimethylhexanebis(2-acrylyl-ethyl urethane), isophorone di(2-acrylyl-ethyl urethane), and the like.

The three above-recited urethane-containing diacrylates are not known to be commercially available. Accordingly, Examples 17 through 19 demonstrate a method for the preparation of each urethane-containing diacrylate recited above.

As the ureadiacetoacetamide, use can be made of compounds having the formula $$H_3C-C(O)-CH_2-C(O)-NH-R^4-NH-C-(O)-HN-R^5-NH-C(O)-HN-R^4-NH-C-(O)-CH_2-C(O)-CH_3$$

wherein $R^5$ represents: 2,2,4-trimethylhexamethylene, 2,4,4-trimethylhexamethylene, mixtures of 2,2,4-trimethylhexamethylene and 2,4,4-trimethylhexamethylene, methylenebis(4-cyclohexylene), and 3-methylene-3,5,5-trimethylcyclohexylene; wherein each $R^4$ may be the same or different and separately represents: a ($C_1$ to $C_{10}$) alkylene group, a ($C_1$ to $C_4$) alkyl substituted ($C_1$ to $C_{10}$) alkylen group, $-(C_2H_4O)_d-C_2H_4-$,

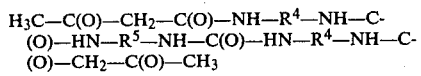

a cycloalkylene group, a cycloalkane bearing two ($C_1$ to $C_3$) alkylene groups, $-H_6C_3O-(C_2H_4O)_e-(C_2H_4)-OC_3H_6-$,

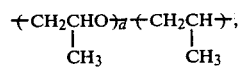, and $-H_6C_3-N\underset{\phantom{x}}{\bigcirc}N-C_3H_6-$;

d is an integer from 1 to 6; and e is an integer from 1 to 4.

Representative of the above usable ureadiacetoacetamides are bis 1,3(1-acetoacetamide-2,2,4-trimethylhexamethylene-6-ureylene)3-methylene-3,5,5-trimethylcyclohexylene (hereinafter UDA-1); bis 4,4(1-acetoacetamide-2,2,4-trimethylhexamethylene-6-ureylene)1,1-methylenedicyclohexylene (hereinafter UDA-2); bis 1',6'(1-acetoacetamide-2,2,4-trimethylhexamethylene-6-ureylene)2,2,4-trimethylhexamethylene (hereinafter UDA-3); bis 1,6(1-acetoacetamide-1,4-dimethylenecyclohexane-4-ureylene)2,2,4-trimethylhexamethylene (hereinafter UDA-4); bis 4,4-(1-acetoacetamide-1,4-dimethylenecyclohexane-4-ureylene)1,1-methylenedicyclohexylene (hereinafter UDA-5); and bis 1,6-(1-acetoacetamide-1,3-dimethylenecyclohexane-4-ureylene)2,2,4-trimethylhexanemethylene (hereinafter UDA-6).

Unlike most of the polyfunctional acrylates, the ureadiacetoacetamides are not known to be commercially available. Accordingly, suitable methods for preparing the ureadiacetoacetamides usable in this invention are set forth in Examples 1 through 10 below.

As the diacetoacetamide, use can be made of compounds having the formula $$R^4+NH-C(O)-CH_2-C(O)-CH_3)_2$$

wherein $R^4$, d, and e are as defined above.

Representative of the above usable diacetoacetamides are isophorone diacetoacetamide, diethylene glycol di-3-acetoacetamide propyl ether, N,N'-bis(propyl-3-acetoacetamide)-piperazine, 1,4 cyclohexanebis(methylacetoacetamide), 1,3 cyclohexanebis(methylacetoacetamide), 2,2,4-trimethylhexamethylenediacetoacetamide, 1,3-propanediacetoacetamide, diethylenglycol-di-2-acetoacetamide-ethyl eyther, dipropyleneglycol diacetoacetamide propyl ether, 1,4-cyclohexanebis(acetoacetamide), trimethylhexamethylene diacetoacetamide, and the like.

The above usable diacetoacetamides are not known to be commercially available. Accordingly, suitable methods for preparing the diacetoacetamides usable in this invention are set forth in Examples 11 through 16 below.

As the cyanoacetate, use can be made of compounds having the formulae $$R^6-O-C(O)-CH_2-CN, \text{ or}$$

$$R^7+O-C(O)-CH_2-CN)_2$$

wherein $R^6$ represents a ($C_1$ to $C_{10}$) alkyl group, benzyl, $CH_3CH_2O-(C_2H_4O)-_fC_2H_4-$, $$CH_3CHO-(C_3H_7)_g-C_3H_6-,$$
$$|\phantom{xx}CH_3$$

a cycloalkane group, and a cycloalkane bearing a ($C_1$ to $C_3$) alkyl group; $R^7$ represents a ($C_1$ to $C_{10}$) alkylene group, a ($C_1$ to $C_4$) alkyl substituted ($C_1$ to $C_{10}$) alkylene group.

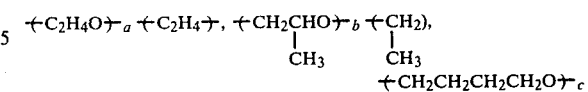

$CH_2CH_2CH_2CH_2$—, a cycloalkylene group, a cycloalkane bearing two ($C_1$ to $C_3$) alkylene group,

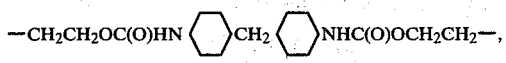

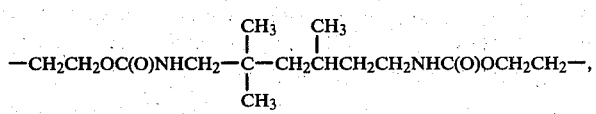

and a, b, and c are as defined above and f is an integer from 0 to 4.

Representative of the above usable cyanoacetates are methylcyanoacetate, ethylcyanoacetate, benzylcyanoacetate, 2-ethoxyethylcyanoacetate, 2-ethoxy-2-ethoxyethylcyanoacetate, 2-propoxypropylcyanoacetate, cyclohexylcyanoacetate, cyclohexymethylcyanoacetate, butanedioldicyanoacetate, hexanedioldicyanoacetate, polyethylene glycol (200) dicyanoacetate, ethylene glycol dicyanoacetate, tripropylene glycol dicyanoacetate, trimethylhexanediol dicyanoacetae, 1,4-cyclohexane dimethanol dicyanoacetate, dibutylene glycol dicyanoacetate, 1,4 cyclohexane dicyanoacetate, and the like.

Of the above usable cyanoacetates, only methylcyanoacetate and ethyl cyanoacetate are known to be commercially available from Aldrich Chemical Company. Accordingly, Examples 20 through 24 below, demonstrate the preparation of several other cyanoacetates suitable for use in this invention.

The amounts of polyfunctional acrylate, cyanoacetate, ureadiacetoacetamide and diacetoacetomide can be varied within wide ranges. Typically, best results are obtained when the molar amount of polyfunctional acrylate falls within the mole ratio range determined according to the following formulae:

Mole ratio range for diacrylate=$X+Y+Z$ to $2X+Y+2Z$

Mole ratio range for triacrylate=$(X+Y+Z)/1.5$ to $2X+Y+2Z/1.5$

Mole ratio range for tetracrylate=$(X+Y+Z)/2$ to $(2X+Y+2Z)/2$ wherein X represents the sum of the moles of ureadiacetoacetamide and diacetoacetamide, Y represents the total moles of monocyanaoacetate and Z represents the total moles of dicyanoacetate.

Although the ureadiacetoacetamides and the diacetoacetamides can be separately prepared, it is preferred, as demonstrated in Examples 1-10, that both ureadiacetoacetamide and diacetoacetamide is prepared in a single reaction rather than being prepared by separate reactions.

As the catalyst to promote the reaction, a Michael reaction, use can be made of any of a variety of well known Michael reaction-type catalysts commonly employed to promote condensation. Particularly suitable are strong basic catalysts such as sodium methoxide, sodium metal, sodium ethylate, benzyl-trimethyl ammonium methoxide, and the like. Catalytic amounts of materials are selected in accordance with well known practices in the polymer art, the amount being one sufficient to promote the polycondensation reaction. For further information relating to the Michael reaction mechanism, see "The Michael Reaction" by E. D. Bergmann et al., *Organic Reactions*, Vol. 10, chapter 3, pages 179-555, and *Modern Synthetic Reactions*, H. O. House, 2nd Ed. (1972), pages 595-623, both herein incorporated by reference.

The polymerization reaction can be carried out using the reactants as the only reaction medium since the polyfunctional acrylates, the cyanoacetate ureadiacetoacetamides, and the diacetoacetamides are normally in the liquid state and/or they can be uniformly blended together.

Further, if the acrylate-cyanoacetate-ureadiacetoacetamidediacetoacetamide copolymer is employed to produce a wear layer composition, the polymerization reaction can be carried out in the presence of art recognized amounts of optical ingredients typically employed in wear layer compositions such as surfactants, heat and light stabilizers, and the like.

The following examples will serve to more fully illustrate specific embodiments of and the best mode for practicing this invention.

EXAMPLE 1

This example demonstrates the preparation of a mixture containing ureadiacetoacetamide and diacetoacetamide (hereinafter designated U-1).

To a reaction vessel were added about 19 grams (0.073 mole) of methylene bis-7-cyclohexyl isocyanate (designated "Hylene W" commercially available from E. I. DuPont) in about 100 milliliters of methylene chloride and about 238 grams (1.44 moles) of 2,2,4-trimethylhexanediamine with stirring.

The contents of the reaction vessel were cooled to and maintained at a temperature of from 0° to 5° C. and about 280 grams (3.34 moles) of diketene were added to the contents of the reaction vessel with cooling to 0° to −5° C.

The contents of the reaction vessel were held at a temperature of from 0° to 5° C. for about 4 hours and then about 60 grams of methylamine were added to the contents of the reaction vessel.

The resulting reaction product was transferred to a separatory funnel and acidified with dilute hydrochloric acid.

The reaction product was washed twice, once with about 250 milliliters of water and about 50 milliliters of saturated sodium chloride solution and a second time with about 250 milliliters of water, about 50 milliliters of saturated sodium chloride solution and a sufficient amount (about 5 cc) of saturated $NaHCO_3$ solution to neutralize the separatory funnel contents to a pH of about 4 to 5.

After the second washing, the methylene chloride layer containing the reaction product was dried with anhydrous magnesium sulfate. The magnesium sulfate was filtered off; the methylene chloride removed by vacuum distillation, and the resulting product observed, analyzed, and found to be a light yellow viscous mixture of 0.05 mole of UDA-2 and 0.95 mole of trietmhylhexanediacetoacetamide. The yield was 474 grams.

EXAMPLE 2

This example demonstrates the preparation of a mixture containing ureadiacetoacetamide and diacetoacetamide.

To a reaction vessel were added about 9.7 grams (0.044 mole) isophorone diisocyanate (3-isocyanatomethyl-3,5,5-trimethylcyclohexylisocyanate) in about 25 milliliters of methylene chloride and about 44.3 grams (0.3 mole) trimethylhexanediamine in about 230 milliliters of methylene chloride with stirring.

The contents of the reaction vessel were cooled to and maintained at a temperature of from 10° to 15° C. and about 41.3 grams (0.49 mole) of diketene were added to the contents of the reaction vessel with cooling to about 10° C.

The contents of the reaction vessel were held at about 10° C. for about 3 hours.

The resulting reaction product was transferred to a separatory funnel and acidified with dilute hydrochloric acid.

The reaction product was washed twice, once with about 250 milliliters of water and about 50 milliliters of saturated sodium chloride solution and a second time with about 250 milliliters of water, about 50 milliliters of saturated sodium chloride solution and a sufficient amount (about 5 cc) of saturated $NaHCO_3$ solution to neutralize the separatory funnel contents to a pH of about 6.

After the second washing, the methylene chloride layer containing the reaction product was dried with anhydrous magnesium sulfate. The magnesium sulfate was filtered off; the methylene chloride removed by vacuum distillation, and the resulting product observed, analyzed, and found to be a light yellow viscous mixture of 0.2 mole of UDA-1 and 0.8 mole of trimethylhexanediacetoacetamide. The yield was 84.5 grams.

EXAMPLE 3

This example demonostrates the preparation of a mixture containing ureadiacetoacetamide and diacetoacetamide using the following ingredients and substantially the procedure of Example 2.

Ingredients 26 grams (0.12 mole) trimethylhexane diisocyanate (TMDI) in 70 milliliters $CH_2Cl_2$
63 grams (0.43 mole) trimethylhexanediamine (TMDA) in 300 milliliters $CH_2Cl_2$
55.5 grams (0.66 mole) diketene The resulting reaction product was viscous, yellow in color, analyzed and found to contain 0.3 mole UDA-3 and 0.7 mole of trimethylhexanediacetoacetamide. The yield was 134.2 grams.

EXAMPLE 4

This example demonstrates the preparation of a mixture containing ureadiacetoacetamide and diacetoacetamide using the following ingredients and substantially the procedure of Example 2.

Ingredients 26 grams (0.12 mole) trimethylhexanediisocyanate (TMDI) in 50 milliliters $CH_2Cl_2$
44.4 grams (0.31 mole) trimethylhexanediamine (TMDA) in 210 milliliters $CH_2Cl_2$
33.6 grams (0.40 mole) diketene The resulting reaction product was viscous, yellow in color, analyzed, and found to contain 0.5 mole of UDA-3 and 0.5 mole of trimethylhexanediacetoacetamide. The yield was 96 grams.

EXAMPLE 5

This example demonstrates the preparation of a mixture containing ureadiacetoacetamide and diacetoacetamide using the following ingredients and substantially the procedure of Example 2.

Ingredients 31.2 grams (0.15 mole) trimethylhexanediisocyanate (TMDI) in 50 milliliters $CH_2Cl_2$
41.5 grams (0.28 mole) trimethylhexanediamine (TMDA) in 200 milliliters $CH_2Cl_2$
28.2 grams (0.34 mole) diketene The resulting reaction product was viscous, yellow in color, analyzed and found to contain 0.75 mole of UDA-3 and 0.25 mole of trimethylhexanediacetoacetamide. The yield was 105 grams.

EXAMPLE 6

This example demonstrates the preparation of a mixture containing ureadiacetoacetamide and diacetoacetamide (hereinafter designated U-6) using the following ingredients and substantially the procedure of Example 1.

Ingredients 36 grams (0.14 mole) "Hylene W" (methylene bis-4-cyclohexyl isocyanate) in 150 milliliters $CH_2Cl_2$
254 grams (1.55 moles) trimethylhexanediamine (TMDA)
271 grams (3.72 moles) diketene The resulting reaction product was viscous, yellow in color, analyzed and found to contain 0.10 mole of UDA-2 and 0.90 mole of trimethylhexanediacetoacetamide. The yield was 486 grams.

EXAMPLE 7

This example demonostrates the preparation of a mixture containing ureadiacetoacetamide and diacetoacetamide using the following ingredients and substantially the procedure of Example 2.

Ingredients 18.2 grams (0.086 mole) trimethylhexanediisocyanate (TMDI) in 20 milliliters $CH_2Cl_2$
10.7 grams (0.07 mole) trimethylhexanediamine and
19.9 grams (0.14 mole) 1,3-cyclohexylbismethylamine in 200 milliliters $CH_2Cl_2$
13.8 grams (0.09 mole) trimethylhexanediamine
39.4 grams (0.47 mole) diketene The resulting reaction product was viscous, yellow in color, analyzed and found to contain 0.3 mole mixed UDA-3 and UDA-6 and 0.7 mole of trimethylhexanediacetoacetamide. The yield was 95 grams.

EXAMPLE 8

This example demonstrates the preparation of a mixture containing ureadiacetoacetamide and diacetoacetamide using the following ingredients and substantially the procedure of Example 2.

Ingredients 26 grams (0.12 mole) trimethylhexanediisocyanate (TMDI) in 50 milliliters $CH_2Cl_2$
19.8 grams (0.13 mole) trimethylhexanediamine and 14.3 grams (0.10 mole) 1,4-cyclohexylbismethylamine in 200 milliliters $CH_2Cl_2$
24.8 grams (0.27 mole) diketene The resulting reaction product was viscous, yellow in color, analyzed and found to contain 0.75 mole of mixed UDA-3 and UDA-4 and 0.25 mole of trimethylhexanediacetoacetamide. The yield was 83 grams.

EXAMPLE 9

This example demonstrates the preparation of a mixture containing ureadiacetoacetamide and diacetoacetamide using the following ingredients and substantially the procedure of Example 2.

Ingredients 26 grams (0.10 mole) "Hylene W" (methylene bis-4-cyclohexylisocyanate) in 40 milliliters $CH_2Cl_2$
18.5 grams (0.13 mole) trimethylhexanediamine and 14.2 grams (0.10 mole) 1,4-cyclohexylbismethylamine in 500 milliliters $CH_2Cl_2$
80.2 grams (0.54 mole) trimethylhexanediamine
114.4 grams (1.36 mole) diketene The resulting reaction product was viscous, yellow in color, analyzed and found to contain 0.15 mole of mixed UDA-2 and UDA-5 and 0.85 mole of trimethylhexanediacetoacetamide. The yield was 250 grams.

EXAMPLE 10

This example demonstrates the preparation of a mixture containing ureadiacetoacetamide and diacetoacetamide using the following ingredients and substantially the procedure of Example 2.

Ingredients 31 grams (0.12 mole) "Hylene W" (methylene bis-4-cyclohexylisocyanate) in 50 milliliters $CH_2Cl_2$
136 grams (0.92 mole) 2,2,4-trimethylhexamethylenediamine in 250 milliliters $CH_2Cl_2$
137 grams (1.63 moles) diketene The resulting reaction product was viscous, yellow in color, analyzed and found to contain 0.15 mole of UDA-2 and 0.85 mole of trimethylhexamethylenediacetoacetamide. The yield was 276 grams.

EXAMPLE 11

This example demonstrates a method for the preparation of isophorone diacetoacetamide.

About 85 grams (0.5 mole) of isophorone diamine (3-aminomethyl 3,5,5-trimethylcyclohexylamine) and about 325 milliliters of methylene chloride were added to a reaction vessel with stirring.

The contents of the reaction vessel were cooled to and maintained at a temperature of about 15° C. and about 80 grams (0.95 mole) of diketene were added to the contents of the reaction vessel over a period of about 1 hour.

The temperature of the contents of the reaction vessel was held at about 15° C. for about 1¾ hours and the resulting reaction product was transferred to a separatory funnel and acidified with dilute hydrochloric acid.

The reaction product was washed twice, once with about 250 milliliters of water and about 50 milliliters of saturated sodium chloride solution and a second time with about 250 milliliters of water, about 50 milliliters of saturated sodium chloride solution and a sufficient amount (about 5 cc) of saturated $NaHCO_3$ solution to neutralize the separatory funnel contents to a pH of about 6.

After the second washing, the methylene chloride layer containing the reaction product was dried with anhyrous magnesium sulfate. The magnesium sulfate was filtered off; the methylene chloride was removed by vacuum distillation and the resulting product, isophorone diacetoacetamide, was recovered in a yield of about 132 grams and observed to be viscous and light yellow in color.

EXAMPLE 12

This example demonstrates a method for the preparation of diethyleneglycol diacetoacetamide propyl ether.

About 66 grams (0.3 mole) of diethyleneglycol diaminopropyl ether (commercially available from Union Carbide Corporation, designated "Polyglycoldiamine H-221") and about 230 milliliters of methylene chloride were added to a reaction vessel with stirring.

The contents of the reaction vessel were cooled to and maintained at a temperature of about 15° C. and about 50.4 grams (0.6 mole) of diketene were added to the contents of the reaction vessel over a period of about 1 hour.

The temperature of the contents of the reaction vessel was held at about 10° to 15° C. for a period of about 4 hours and the methylene chloride was removed by vacuum distillation.

The resulting reaction product was dissolved in isopropyl alcohol and recrystallized from the alcohol. The resulting product, diethyleneglycol diacetoacetamide propyl ether, was recovered and found to have a melting point range of about 62° to 63° C. and observed to be white in color.

EXAMPLE 13

This example demonstrates a method for the preparation of N,N'-bis(propyl-3-acetoacetamide)-piperazine.

The following ingredients were reacted using substantially the procedure of Example 11 with the exception that the contents of the reaction vessel were held at 10° to 15° C. for a period of about 4 hours instead of the 1¾ hours in Example 11.

| Ingredients | Amount |
| --- | --- |
| diketene | 50.4 grams (0.6 mole) |
| N,N'-bis(aminopropyl)-piperazine | 60 grams (0.3 mole) |
| methylene chloride | 250 milliliters |

The resulting product, N,N'-bis(propyl-3-acetoacetamide)-piperazine, was recovered in a yield of about 92 grams and observed to be viscous and light yellow in color.

EXAMPLE 14

This example demonstrates a method for the preparation of 1,4-cyclohexanebis(methylacetoacetamide).

The following ingredients were reacted using substantially the procedure of Example 12 with the exception that the contents of the reaction vessel were held at about 15° C. for about 2 hours.

| Ingredients | Amount |
| --- | --- |
| diketene | 33.6 grams (0.4 mole) |
| 1,4 cyclohexanebis(methylamine) | 28.4 grams (0.2 mole) |
| methylene chloride | 100 milliliters |

The resulting crude product, 1,4-cyclohexanebis(methylacetoacetamide), was recovered and recrystallized from isopropyl alcohol. The recrystallized product was found to have a melting point range of about 140° to 143° C. and observed to be white in color.

EXAMPLE 15

This example demonstrates a method for the preparation of 1,3-cyclohexanebis(methylacetoacetamide).

The following ingredients were reacted using substantially the procedure of Example 12 with the exception that chloroform was substituted for the methylene chloride, and rather than recrystallizing in isopropyl alcohol, the reaction product was washed in benzene.

| Ingredients | Amount |
| --- | --- |
| diketene | 84 grams (1 mole) |
| 1,3-cyclohexanebis(methylamine) | 71 grams (0.5 mole) |
| chloroform | 250 milliliters |

The benzene insoluble fraction of the reaction product was recovered as 1,3-cyclohexanebis(methylacetoacetamide) and found to have a melting point range of about 105° to 115° C. and observed to be light yellow in color.

EXAMPLE 16

This example demonstrates a method for the preparation of 2,2,4-trimethylhexamethylenediacetoacetamide.

The following ingredients were reacted using substantially the procedure of Example 11 with the exception that the contents of the reaction vessel were held at 10° to 15° C. for a period of about 2 hours instead of the 1¾ hours in Example 11.

| Ingredients | Amount |
| --- | --- |
| diketene | 49.2 grams (0.59 mole) |
| trimethylhexanediamine | 45.3 grams (0.31 mole) |
| methylene chloride | 150 milliliters |

The resulting product, 2,2,4-trimethylhexamethylenediacetoacetamide, was recovered in a yield of about 89 grams and observed to be light yellow in color and viscous.

EXAMPLE 17

This example demonstrates the preparation of a urethane-containing diacrylate.

About 1 mole of methylenebis-4-cyclohexane isocyanate (designated "Hylene W", commercially available from E. I. DuPont de Nemours Co.) and about 2 moles of hydroxyethylacrylate and about 0.05 gram of dibutyltin dilaurate catalyst were added to a reaction vessel at room temperature, with stirring. The temperature of the reaction vessel was increased to about 60° C. After about 3 hours, the resulting reaction product, methylenebis(4-cyclohexane-2-acryl-ethyl urethane), having the formula

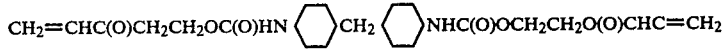

was recovered.

EXAMPLE 18

This example demonstrates the preparation of a urethane-containing diacrylate.

About 1 mole of 2,2,4-trimethylhexane diisocyanate (designated "TMDI", commercially available from Thorson Chemical Co.) and about 2 moles of hydroxyethylacrylate and about 0.05 gram of dibutyltin dilaurate catalyst were added to a reaction vessel at room temperature, with stirring. The temperature of the reaction vessel was increased to about 60° C. After about 3 hours, the resulting reaction product, 2,2,4-trimethylhexane-bis(2-acrylyl-ethyl urethane), having the formula

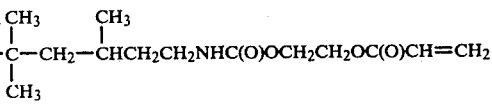

was recovered.

EXAMPLE 19

This example demonstrates the preparation of a urethane-containing diacrylate.

About 1 mole of 3-isocyanatomethyl-3,5,5-trimethylcyclohexyl isocyanate (designated "IPDI" isophorone diisocyanate, commercially available from Thorson Chemical Co.) and about 2 moles of hydroxyethylacrylate and about 0.05 gram of dibutyltin dilaurate catalyst were added to a reaction vessel at room temperature, with stirring. The temperature of the reaction vessel was increased to about 60° C. After about 3 hours, the resulting reaction product, isophorone di(2-acrylylethyl urethane), having the formula

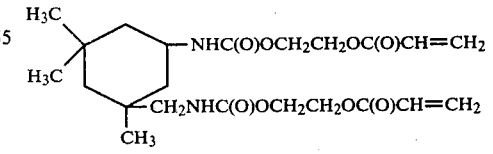

was recovered.

EXAMPLE 20

This example demonstrates the preparation of benzyl-cyanoacetate.

184 grams (1.70 moles) of benzyl alcohol, 174 grams (2.04 moles) of cyanoacetic acid, 2 grams dibutyltindioctoate and 75 ml isoctane were added to a reaction vessel with stirring and heated at 99° to 103° C. for about 12 hours.

The resulting reaction product was washed with saturated NaHCO$_3$ to a pH of about 8 and fractionally distilled at 1 mm pressure into three fractions.

The three fractions were analyzed by gas chromatography and determined to be 85%, 100% and 100% benzylcyanoacetate, respectively. The total yield of benzylcyanoacetate was 236 grams or 79%.

EXAMPLE 21

This example demonstrates the preparation of cyclohexylcyanoacetate.

250 grams (2.5 moles) of cyclohexanol, 255 grams (3.0 moles) of cyanoacetic acid, 2.5 grams of dibutyltindioctoate and 75 ml isooctane were added to a reaction vessel with stirring and heated at 100° to 110° C. for about 12 hours.

The resulting reaction product was washed with saturated NaHCO$_3$ to a pH of about 8 and fractionally distilled at 1 mm pressure into two fractions.

The two fractions were analyzed by gas chromatography and determined to be 97.6% and 99.6% cyclohexylcyanoacetate respectively. The total yield of cyclohexylcyanoacetate was 357 grams or 86%.

EXAMPLE 22

This example demonstrates the preparation of cyclohexylbismethylcyanoacetate.

101 grams (0.7 mole) of 1,4-cyclohexamethylenebismethylol, 131 grams (1.20 moles) of cyanoacetic acid, 1.5 grams of dibutyltindioctoate and 75 ml toluene were added to a reaction vessel with stirring and heated at 108° to 118° C. for about 5 hours.

The resulting reaction product was dissolved in 150 ml methylene chloride and washed four times with hot water and found to have a pH of about 4.

Next, the toluene and methylene chloride were removed at reduced pressure.

The crude product was recrystallized from isopropanol and recovered as 1,4 cyclohexylbismethylcyanoacetate at a yield of 147 grams or 67%.

EXAMPLE 23

This example demonstrates the preparation of butanedioldicyanoacetate.

63 grams (0.70 mole) of 1,4-butanediol, 131 grams (1.47 moles) of cyanoacetic, 1.5 grams of dibutyltindioctoate and 75 ml of toluene were added to a reaction vessel with stirring and heated 3½ hours at 100° to 109° C.

The resulting reaction product was diluted with methylene chloride and washed four times with water to remove unreacted cyanoacetic acid.

Next, the methylene chloride was removed at reduced pressure.

The crude product was recrystallized from methanol-isopropanol and recovered as butanedioldicyanoacetate at a yield of about 130 grams.

EXAMPLE 24

This example demonstrates the preparation of hexanedioldicyanoacetate.

160 grams (1.36 moles) of 1,6-hexanediol, 212 grams (2.65 moles) of cyanoacetic acid, 1 gram of dibutyltindioctoate and 75 ml of toluene were added to a reaction vessel with stirring and heated at 112° to 133° C. for 7 hours.

The resulting reaction product was diluted with 500 ml methylene chloride, washed with saturated NaHCO$_3$ to a pH of about 8, and water washed.

Next, the methylene chloride and toluene were removed at reduced pressure.

The crude product was recrystallized from isopropanol and recovered as hexanedioldicyanoacetate at a yield of 221 grams or 62%.

EXAMPLE 25

This example demonstrates the preparation of a polymer film of this invention.

About 1.05 moles of hexanediol diacrylate, about 0.3 mole of trimethylolpropanetriacrylate, about 0.5 mole of cyclohexylcyanoacetate of Example 21, about 1.0 mole of the reaction product mixture of Example 6 (containing 0.1 mole UDA-2, and 0.9 mole of 2,2,4-trimethylhexamethylenediacetoacetamide) about 0.4 percent by weight of the reactants of a 30% by weight polyethyleneoxide siloxane surfactant (Dow Corning DC-193) in methanol solution and about 1 percent by weight of the reactants of a 15% by weight sodium methoxide in methanol catalyst solution were added to a reaction vessel at room temperature with stirring.

The resulting polymer mixture was coated on a glass surface using a Bird applicator to a coating thickness of about 0.003 inch. And, the coating was allowed to cure for about 15 minutes at a temperature of about 90° C.

The resulting cured polymer film was removed from the glass surface and observed to be clear and colorless. The film was tested by differential scanning calorimetery (DuPont 900 Thermal Analyzer) and found to have a Tg midpoint of about 34° C. The cured polymer film was also found to have a tensile strength of 3,018 psi and a percent elongation of 177.

EXAMPLE 26

The following ingredients were reacted, coated on glass and cured using substantially the procedure of Example 25.

| Ingredients | Amount |
|---|---|
| hexanediol diacrylate | 0.95 mole |
| trimethylolpropane triacrylate | 0.5 mole |
| cyclohexylcyanoacetate of Example 21 | 0.5 mole |
| reaction product mixture of Example 6 | 1.0 mole |
| 30% by weight "DC-193" in methanol solution | 0.4% by weight |
| 15% by weight sodium methoxide in methanol catalyst solution | 1% by weight |

The resulting cured polymer film was removed from the glass surface and observed to be clear and colorless. The film was tested and found to have a Tg midpoint of about 33° C. The polymer film was also found to have a tensile strength of 3,481 psi and a percent elongation of 220.

The following Table I contains Examples 27 through 29. All polymer compositions were prepared coated on glass and cured using substantially the procedure of Example 25. All examples were catalyzed with 1 percent by weight of a 15 percent by weight sodium methoxide in methanol solution and included 0.4 percent by weight of a 30 percent by weight "DC-193" in methanol solution surfactant.

Table I

Cured Polymer Films of 1.0 Mole of the
Reaction Product Mixture of Example 6 (U-6) With
Hexanediol Diacrylate (HDDA),
Trimethylolpropane Triacrylate (TMPTA), and
Cyclohexylcyanoacetate (CHCA)

| Example No. | Ingredients and Amount (Moles) | | | | Tg (DSC) Midpoint | Tensile Strength PSI | % Elongation |
|---|---|---|---|---|---|---|---|
| 27 | 1.0M U-6 | 1.3M HDDA | 0.5M TMPTA | 0.75M CHCA | 32° | 3,774 | 223 |
| 28 | 1.0M U-6 | 1.55M HDDA | 0.5M TMPTA | 1.0M CHCA | 25° | 3,830 | 262 |
| 29 | 1.0M U-6 | 1.8M HDDA | 0.5M TMPTA | 1.25M CHCA | 26° | 3,402 | 275 |

The following Table II contains Examples 37 and 57. All polymer compositions were prepared coated on glass and cured using substantially the procedure of Example 25. All examples were catalyzed with 1 percent by weight of a 15 percent by weight sodium methoxide in methanol solution and included 0.4 percent by weight of a 30 percent by weight "DC-193" in methanol solution surfactant.

6 (containing 0.1 mole of UDA-2 and 0.9 mole of 2,2,4-trimethylhexamethylenediacetoacetamide), about 0.4% by weight of the reactants of a 30% by weight polyethyleneoxide surfactant (Dow Corning DC-193) in methanol solution and about 9% by weight of the reactants of a 15% by weight sodium methoxide in methanol catalyst solution were added to the reaction vessel at room temperature with stirring.

Table II

Cured Acrylate-Cyanoacetate-Ureadiacetoacetamide-Diacetoacetamide Copolymer Films

| Ex. No. | Ingredients and Amount (Moles) | | | | | | | | | Tg (DSC) Midpoint(s) | Tensile Strength (PSI) | Percent Elongation |
|---|---|---|---|---|---|---|---|---|---|---|---|---|
| 30 | 1.0M | U-6[1] | 1.55M | HDDA[2] | 0.5M | PETA[3] | 0.5M | CHCA[4] | | 30°, 35° | Not Tested | Not Tested |
| 31 | 1.0 | U-6[1] | 1.25 | HDDA[2] | 0.5 | PETA[3] | 0.5 | CHCA[4] | | 3°, 36° | " | " |
| 32 | 1.0 | U-1[5] | 1.25 | HDDA[2] | 0.5 | PETA[3] | 0.5 | CHCA[4] | | 1°, 40° | " | " |
| 33 | 1.0 | U-6 | 1.30 | HDDA[2] | 0.5 | PETA[3] | 0.5 | CHCA[4] | | 6°, 41° | " | " |
| 34 | 1.0 | U-6 | 1.05 | HDDA[2] | 0.5 | PETA[3] | 0.5 | CHCA[4] | | 36° | " | " |
| 35 | 1.0 | U-1 | 1.30 | HDDA[2] | 0.5 | PETA[3] | 0.5 | CHCA[4] | | 31° | " | " |
| 36 | 1.0 | U-6 | 2.4 | HDDA[2] | 0.1 | TMPTA[6] | 0.75 | MCA[7] | | 25° | 2,428 | 137 |
| 37 | 1.0 | U-6 | 2.65 | HDDA[2] | 0.2 | TMPTA[6] | 1.0 | MCA[7] | | 18° | 1,048 | 95 |
| 38 | 1.0 | U-6 | 2.65 | HDDA[2] | 0.2 | TMPTA[6] | 1.0 | ECA[8] | | 20° | 2,006 | 128 |
| 39 | 1.0 | U-6 | 2.65 | HDDA[2] | 0.2 | TMPTA[6] | 1.0 | CHCA | | 24° | 1,612 | 101 |
| 40 | 1.0 | U-6 | 2.65 | HDDA[2] | 0.2 | TMPTA[6] | 1.0 | BZCA[9] | | 16° | 1,034 | 127 |
| 41 | 1.0 | U-6 | 3.5 | HDDA[2] | — | | 0.2 | HDDCA[10] | 1.0 MCA | 16° | 982 | 86 |
| 42 | 1.0 | U-6 | 4.1 | HDDA[2] | — | | 0.4 | HDDCA[10] | | 7° | 601 | 67 |
| 43 | 1.0 | U-6 | 2.2 | HDDA[2] | — | | 0.5 | CHCA | | 23° | 882 | 118 |
| 44 | 1.0 | U-6 | 2.65 | HDDA[2] | — | | 0.75 | CHCA | | 20° | 857 | 120 |
| 45 | 1.0 | U-6 | 3.1 | HDDA[2] | — | | 1.0 | CHCA | | 18° | 1,676 | 150 |
| 46 | 1.0 | U-6 | 1.9 | HDDA[2] | 0.2 | TMPTA | 0.5 | CHCA | | 27° | 1,822 | 142 |
| 47 | 1.0 | U-6 | 2.35 | HDDA[2] | 0.2 | TMPTA | 0.75 | CHCA | | 27° | 1,707 | 115 |
| 48 | 1.0M | U-6[1] | 2.8M | HDDA | 0.2M | TMPTA | 1.0M | CHCA[4] | 0.35 MCA | 22° | 940 | 95 |
| 49 | 1.0 | U-6[1] | 2.35 | HDDA | 0.2 | TMPTA | 0.4 | CHCA[4] | 0.50 MCA | 27° | 2,798 | 118 |
| 50 | 1.0 | U-6[1] | 2.8 | HDDA | 0.2 | TMPTA | 0.5 | CHCA[4] | | 21° | 1,907 | 125 |
| 51 | 1.0 | U-6[1] | 1.8 | HDDA | | — | 0.5 | MCA | | 19° | 4,690 | 266 |
| 52 | 1.0 | U-6[1] | 1.95 | HDDA | | — | 0.5 | MCA | | 6°, 33° | 4,722 | 200 |
| 53 | 1.0 | U-6[1] | 1.43 | HDDA | 0.25 | TMPTA | 0.5 | MCA | | 4°, 30°, | 4,372 | 222 |
| 54 | 1.0 | U-6[1] | 1.58 | HDDA | 0.25 | TMPTA | 0.5 | MCA | | 7°, 34° | 4,952 | 189 |
| 55 | 1.0 | U-6[1] | 1.58 | HDDA | 0.25 | TMPTA | 0.5 | ECA | | 15°, 35° | 3,542 | 202 |
| 56 | 1.0 | U-6[1] | 1.05 | HDDA | 0.5 | TMPTA | 0.5 | MCA | | 15°, 35° | 4,441 | 183 |
| 57 | 1.0 | U-6[1] | 1.20 | HDDA | 0.5 | TMPTA | 0.5 | MCA | | 7°, 38° | 3,845 | 118 |

[1] U-6 reaction product mixture of Example 6
[2] HDDA hexanedioldiocrylate
[3] PETA pentaerythritol tetraacrylate
[4] CHCA cyclohexylcyanoacetate
[5] U-1 reaction product mixture of Example 1
[6] TMPTA trimethylolpropanetriacrylate
[7] MCA methylcyanoacetate
[8] ECA ethylcyanoacetate
[9] BZCA benzylcyanoacetate
[10] HDDCA hexanedioldicyanoacetate

EXAMPLE 58

This example demonstrates the preparation of a thermoplastic floor covering which was coated with a wear layer composition comprising a cross-linked random acrylate-cyanoacetate-ureadiacetoacetamide-diacetoacetamide copolymer of this invention.

About 1.35 moles of hexanedioldiacrylate, about 0.3 mole of trimethylolpropanetriacrylate, about 0.5 mole of cyclohexylcyanoacetate of Example 21, about one mole of (U-6) the reaction product mixture of Example The resulting wear layer composition was applied to a thickness of 0.003 inch using a conventional applicator, in this example a Bird applicator, to a 12"×12" white vinyl tile and cured at 90° C. for about 15 minutes.

The resulting cured acrylate-cyanoacetate-ureadiacetoacetamide-diacetoacetamide copolymer wear layer on the tile was observed to be clear and colorless.

The wear layer coated tile was tested for gloss retention using an art recognized traffic wheel test. The initial gloss value, before testing, was 91 units (Gardner Difference Reflectance). After 90 minutes of testing, the gloss value was 81. The gloss retention of the coated tile was rated as excellent having lost only 10 gloss units after the 90 minutes of testing.

It will be evident from the foregoing that various modifications can be made to the present invention. Such, however, are considered as being within the scope of this invention.

What is claimed is:

1. A cross-linked acrylate-cyanoacetate-ureadiacetoacetamide copolymer produced by the reaction of at least one polyfunctional acrylate with at least one cyanoacetate, and at least one ureadiacetoacetamide in the presence of a catalyst capable of promoting the reaction between the polyfunctional acrylate, the cyanoacetate and the ureadiacetoacetamide.

2. A cross-linked acrylate-cyanoacetate-diacetoacetamide copolymer produced by the reaction of at least one polyfunctional acrylate with at least one cyanoacetate, and at least one diacetoacetamide in the presence of a catalyst capable of promoting the reaction between the polyfunctional acrylate, the cyanoacetate and the diacetoacetamide.

3. A cross-linked random acrylate-cyanoacetate-ureadiacetoacetamide-diacetoacetamide copolymer produced by the reaction of at least one polyfunctional acrylate with at least one cyanoacetate, at least one ureadiacetoacetamide and at least one diacetoacetamide in the presence of a catalyst capable of promoting the reaction between the polyfunctional acrylate, the cyanoacetate, the ureadiacetoacetamide, and the diacetoacetamide.

4. The cross-linked random copolymer of claim 3 in which said polyfunctional acrylate has the formula $$R+O—C(O)—CH=CH_2)_4$$

wherein R represents

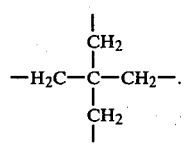

5. The cross-linked random copolymer of claim 1 in which said polyfunctional acrylate has the formula $$R^1+O—C(O)—CH=CH_2)_3$$

wherein $R^1$ represents

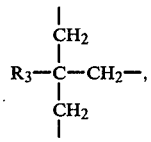

and $R_3$ represents hydrogen or ($C_1$ to $C_3$) alkyl.

6. The cross-linked random copolymer of claim 1 in which said polyfunctional acrylate has the formula $$R^2+O—C(O)—CH=CH_2)_2$$

wherein $R^2$ represents: a ($C_1$ to $C_{10}$) alkylene group, a ($C_1$ to $C_4$) alkyl substituted ($C_1$ to $C_{10}$) alkylene group, $+C_2H_4O+_a+C_2H_4+$,

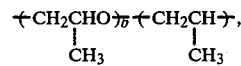

$+CH_2CH_2CH_2CH_2O+_cCH_2CH_2CH_2CH_2—$, a cycloalkylene group, a cycloalkane bearing two ($C_1$ to $C_3$) alkylene groups,

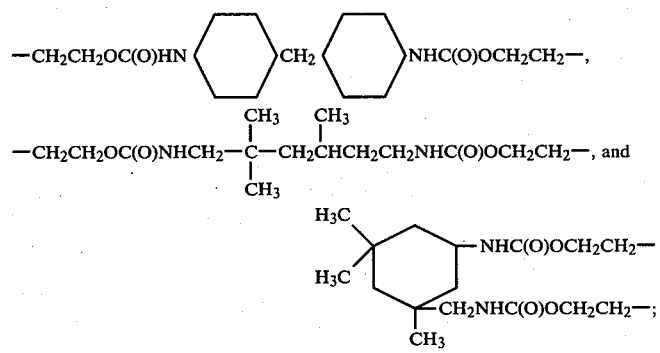

a is an integer from 1 to 20; b is an integer from 1 to 10; and c is an integer from 1 to 5.

7. The cross-linked random copolymer of claim 3 in which said ureadiacetoacetamide has the formula $$H_3C—C(O)—CH_2—C(O)—NH—R^4—NH—C-$$
$$(O)—HN—R^5—NH—C(O)—HN—R^4—NH—C-$$
$$(O)—CH_2—C(O)—CH_3$$

Wherein $R^5$ represents:
2,2,4-trimethylhexamethylene,
2,2,4-trimethylhexamethylene, mixtures of
2,2,4-trimethylhexamethylene, and
2,2,4-trimethylhexamethylene,
methylenebis(4-cyclohexylene), and
3-methylene-3,5,5-trimethylcyclohexylene;
wherein each $R^4$ may be the same or different and separately represents: a ($C_1$ to $C_{10}$) alkylene group, a ($C_1$ to $C_4$) alkyl substituted ($C_1$ to $C_{10}$) alkylene group, $+C_2H_4O+_d$ $+C_2H_4+$,

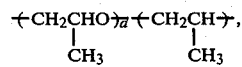

a cycloalkylene group, a cycloalkane bearing two (C₁ to C₃)alkylene groups, —H₆C₃O—(—C₂H₄O—)ₑ—C₂H₄—OC₃H₆—,

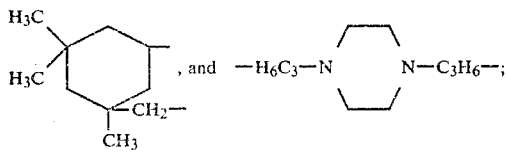

d is an integer from 1 to 6; and e is an integer from 1 to 4.

8. The cross-linked random copolymer of claim 3 in which said diacetoacetamide has the formula

R⁴—(NH—C(O)—CH₂—C(O)—CH₃)₂ wherein R⁴, d, and e are as defined above.

9. The cross-linked random copolymer of claim 3 in which said cyanoacetate has the formula

R⁶—O—C(O)—CH₂—CN wherein R⁶ represents a (C₁ to C₁₀) alkyl group, benzyl, CH₃CH₂O—(—C₂H₄O—)ₑC₂H₄—,

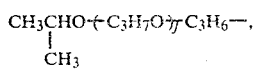

a cycloalkene group, and a cycloalkane bearing a (C₁ to C₃) alkyl group and f is an integer from 0 to 4.

10. The cross-linked random copolymer of claim 3 in which said cyanoacetate has the formula

R⁷—(O—C(O)—CH₂—CN)₂ wherein R⁷ represents a (C₁ to C₁₀ alkylene group, a (C₁ to C₄) alkyl substituted C₁ to C₁₀) alkylene group, —(C₂H₄O)ₐ—(C₂H₄)—,

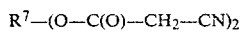

—(CH₂CH₂CH₂CH₂O)ₑ—CH₂CH₂CH₂CH₂—, a cycloalkylene group, a cycloalkane bearing two (C₁ to C₃) alkylene groups,

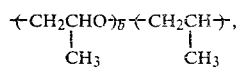

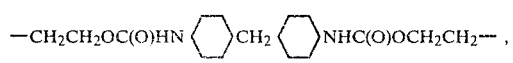

and a, b, and c are as defined above.

11. A thermoplastic floor covering coated with a wear layer composition comprising a cross-linked acrylate-cyanoacetate-ureadiacetoacetamide copolymer produced by the reaction of at least one polyfunctional acrylate with at least one cyanoacetate, and at least one ureadiacetoacetamide in the presence of a catalyst capable of promoting the reaction between the polyfunctional acrylate and the ureadiacetoacetamide.

12. A thermoplastic floor covering coated with a wear layer composition comprising a cross-linked acrylate-cyanoacetate-diacetoacetamide copolymer produced by the reaction of at least one polyfunctional acrylate with at least one cyanoacetate, and at least one diacetoacetamide in the presence of a catalyst capable of promoting the reaction between the polyfunctional acrylate, the cyanoacetate and the diacetoacetamide.

13. A thermoplastic floor covering coated with a wear layer composition comprising a cross-linked random acrylate-cyanoacetate-ureadiacetoacetamide-diacetoacetamide copolymer produced by the reaction of at least one polyfunctional acrylate with at least one cyanoacetate, at least one ureadiacetoacetamide and at least one diacetoacetamide in the presence of a catalyst capable of promoting the reaction between the polyfunctional acrylate, the cyanoacetate, the ureadiacetoacetamide, and the diacetoacetamide.

14. The thermoplastic floor covering of claim 13 in which aid polyfunctional acrylate has the formula

R(O—C(O)—CH=CH₂)₄ wherein R represents

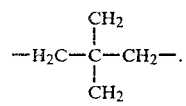

15. The thermoplastic floor covering of claim 13 in which said polyfunctional acrylate has the formula

R¹—(O—C(O)—CH=CH₂)₃ wherein R¹ represents

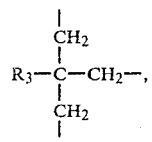

and R₃ represents hydrogen or (C₁ to C₃) alkyl.

16. The thermoplastic floor covering of claim 13 in which said polyfunctional acrylate has the formula

R²—(O—C(O)—CH=CH₂)₂ wherein R² represents: a (C₁ to C₁₀) alkylene group, a (C₁ to C₄) alkyl substituted (C₁ to C₁₀) alkylene group, —(C₂H₄O)ₐ—(C₂H₄)—,

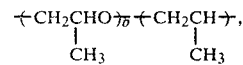

$+CH_2CH_2CH_2CH_2O+_cCH_2CH_2CH_2CH_2—$, a cycloalkylene group, a cycloalkane bearing two ($C_1$ to $C_3$) alkylene groups,

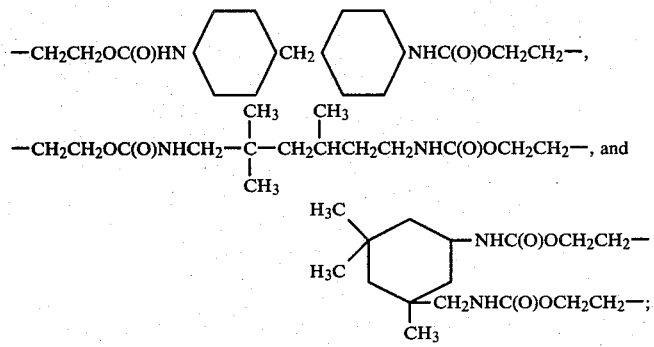

a is an integer from 1 to 20; b is an integer from 1 to 10; and c is an integer from 1 to 5.

17. The thermoplastic floor covering of claim 13 in which said ureadiacetoacetamide has the formula $$H_3C—C(O)—CH_2—C(O)—NH—R^4—NH—C-(O)—HN—R^5—NH—C(O)—HN—R^4—NH—C-(O)—CH_2—C(O)—CH_3$$

wherein $R^5$ represents: 2,2,4-trimethylhexamethylene, 2,4,4-trimethylhexamethylene, mixtures of 2,2,4-trimethylhexamethylene and 2,4,4-trimethylhexamethylene, methylenebis(4-cyclohexylene), and 3-methylene-3,5,5-trimethylcyclohexylene; wherein each $R^4$ may be the same or different and separately represents: a ($C_1$ to $C_{10}$) alkylene group, a ($C_1$ to $C_4$) alkyl substituted ($C_1$ to $C_{10}$) alkylene group, $+C_2H_4O+_d—C_2H_4—$,

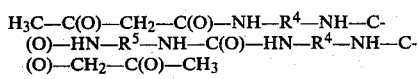

a cycloalkylene group, a cycloalkane bearing two ($C_1$ to $C_3$) alkylene groups, $—H_6C_3O+C_2H_4O+_e+C_2H_4+OC_3H_6—$,

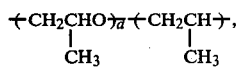, and 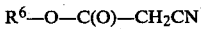

d is an integer from 1 to 6; and e is an integer from 1 to 4.

18. The thermoplastic floor covering of claim 13 in which said diacetoacetamide has the formula $$R^4+NH—C(O)—CH_2—C(O)—CH_3)_2$$

wherein $R^4$, d, and e are as defined above.

19. The thermoplastic floor covering of claim 13 in which said cyanoacetate has the formula $$R^6—O—C(O)—CH_2CN$$

wherein $R^6$ represents a ($C_1$ to $C_{10}$) alkyl group, benzyl, $CH_3CH_2O+C_2H_4O+_fC_2H_4—$,

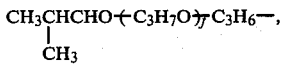

a cycloalkane group, and a cycloalkane bearing a ($C_1$ to $C_3$) alkyl group and f is an integer from 0 to 4.

20. The thermoplastic floor covering of claim 13 in which said cyanoacetate has the formula $$R^7—(O—C(O)—CH_2—CN)_2$$

wherein $R^7$ represents a ($C_1$ to $C_{10}$ alkylene group, a ($C_1$ to $C_4$) alkyl substituted ($C_1$ to $C_{10}$) alkylene group, $+C_2H_4O+_a+C_2H_4+$,

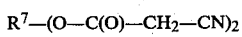

$+CH_2CH_2CH_2CH_2O+_cCH_2CH_2CH_2CH_2—$, a cycloalkylene group, a cycloalkane bearing two ($C_1$ to $C_3$) alkylene groups,

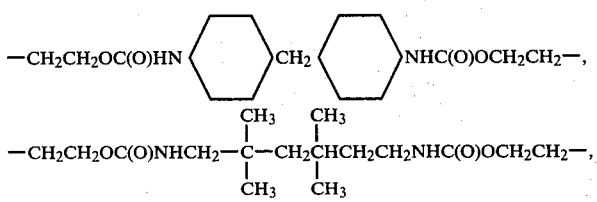

and a, b, and c are as defined above.

* * * * *